US008532356B2

(12) United States Patent
Kiraly et al.

(10) Patent No.: US 8,532,356 B2
(45) Date of Patent: Sep. 10, 2013

(54) METHOD FOR AUTOMATIC SEPARATION OF SEGMENTED TUBULAR AND CIRCULAR OBJECTS

(75) Inventors: Atilla P. Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1020 days.

(21) Appl. No.: 11/762,993

(22) Filed: Jun. 14, 2007

(65) Prior Publication Data
US 2008/0044072 A1   Feb. 21, 2008

Related U.S. Application Data

(60) Provisional application No. 60/806,810, filed on Jul. 10, 2006.

(51) Int. Cl.
*G06K 9/00* (2006.01)
(52) U.S. Cl.
USPC .............................. 382/131; 382/13; 600/407
(58) Field of Classification Search
USPC .................................. 382/130, 131; 600/407
See application file for complete search history.

(56) References Cited

U.S. PATENT DOCUMENTS

| 6,690,816 | B2 * | 2/2004 | Aylward et al. ............... 382/128 |
| 7,020,314 | B1 * | 3/2006 | Suri et al. ....................... 382/130 |
| 2005/0240094 | A1 * | 10/2005 | Pichon et al. ................. 600/407 |
| 2006/0056685 | A1 | 3/2006 | Kiraly et al. |

FOREIGN PATENT DOCUMENTS

WO    WO 2006/085254 A1    8/2006

OTHER PUBLICATIONS

Burrowes et al., "Anatomically based finite element models of the human pulmonary arterial and venous trees inclusing supernumerary vessels", Mar. 31, 2005, Journal of Applied Physiology, 731-738.*
Bulow et al., "Automatic Extraction of the Pulmonary Artery Tree from Multi-Slice CT Data", 2005, SPIE Medical Imaging, Physiology, Function and Structure from Medical Images, 730-740.*
Gao et al., "Automatic 3D Vascular Tree Construction of Perforator Flaps for Plastic Surgery Planning", Sep. 2004, Proceedings of the 26th Annual International Conference of the IEEE EMBS, 3424-3427.*
Zhou et al., "Computerized Detection of Pulmonary Embolism in 3D Computed Tomographic (CT) Images: Vessel Tracking and Segmentation Techniques", Proceedings of SPIE vol. 5032 (2003), 1613-1620.*
Ezquerra et al., "Model-Guided Labeling of Coronary Structure", IEEE Transactions on Medical Imaging, vol. 17, No. 3, Jun. 1998.*
Felkel et al., "Surface Models of Tube Trees", Proceedings of the Computer Graphics International (CGI'04).*

(Continued)

*Primary Examiner* — David Zarka
*Assistant Examiner* — Katrina Fujita

(57) ABSTRACT

A method for labeling connected tubular objects within segmented image data, including: receiving segmented image data; and labeling the segmented image data to identify a plurality of components in the segmented image data, wherein the labeling includes: processing the segmented image data to create a processed image that represents centerline and radii estimates of the connected tubular components; determining seed point candidates in the processed image that are within a band of radii; grouping the candidates based on their physical distance from each other and their radii estimates; partitioning the segmented image data in accordance with the grouped candidates; and assigning a separate color label to each of the plurality of components that are different from each other.

18 Claims, 7 Drawing Sheets

(56) References Cited

OTHER PUBLICATIONS

T. Lei, J.K. Udupa, P.K. Saha, and D. Odhner, "Artery-Vein Separation via MRA—An Image Processing Approach," IEEE TMI, vol. 20., No. 8, Aug. 2001.

C.M. van Bemmel, L.J. Spreeuwers, M.A. Viergever, and W.J. Niessen, "Level-Set-Based Artery-Vein Separation in Blood Pool Agent CE-MR Angiograms," IEEE TMI, vol. 22, No. 10, Oct. 2003.

T. Bulow, R. Wiemaker, T. Blaffert, C. Lorenz, and S. Renisch, "Automatic Extraction of the Pulmonary Artery Tree from Multi-Slice CT Data," SPIE Medical Imaging 2005: Physiology, Function, and Structure from Medical Images, pp. 730-740. 2005.

S.R. Aylward and E. Bullitt, "Initialization, Noise, Singularities, and Scale in Height Ridge Transversal for Tubular Object Centerline Extraction," IEEE TMI, vol. 21. No. 2, Feb. 2002.

A.P. Kiraly, E.Pichon, D.P. Naidich, C.L. Novak, "Analysis of arterial sub-trees affected by Pulmonary Emboli," SPIE Medical Imaging 2004, 5370, 2004.

A.P. Kiraly, J.P. Helferty, E.A. Hoffman, G. McLennan, and W.E. Higgins "3D Path Planning for Virtual Bronchoscopy", IEEE Trans. on Medical Imaging, pp. 1365-1379, vol. 23, Nov. 2004.

* cited by examiner

METHOD FOR AUTOMATIC SEPARATION OF SEGMENTED TUBULAR AND CIRCULAR OBJECTS

CROSS-REFERENCE TO RELATED APPLICATION

This application claims the benefit of U.S. Provisional Application No. 60/806,810, filed Jul. 10, 2006, the disclosure of which is incorporated by reference herein in its entirety.

BACKGROUND OF THE INVENTION

1. Technical Field

The present invention relates to image segmentation, and more particularly, to a method for automatic separation of segmented tubular and circular objects.

2. Discussion of the Related Art

In general, segmentations of branching or multiple tubular objects in close proximity to each other relative to the resolution of an imaging device result in the fusing together of originally distinct structures, Image noise, partial volume artifacts, and other factors can also contribute to the fusing together of such structures. An example of the fusing together of originally distinct structures involves the segmentation of the vessels within the lungs. Here, the arteries and veins are frequently segmented together as a single component. Similar situations are also found within arteries and veins throughout the body. As a result, the goal of many researchers is to get a segmentation that illustrates the arteries and/or veins separately.

The ability to create separate segmentations for the arteries and veins can allow for improvements in visualization and Computer Aided Detection (CAD) by eliminating unneeded data. For example, pulmonary embolism (PE) is a condition where a clot occurs within the arteries of the lungs. An examination to determine if a PE exists does not require a physician to search within the veins. Hence, if only the arteries were identified and the veins eliminated, the search would be simplified.

Approaches to artery-vein segmentation can involve physical methods for discrimination. These methods depend on differences in the direction of flow, differences in the uptake of contrast agents, or measurements of blood oxygen levels. However, these approaches require specific contrast agents, complex acquisitions, or limit the imaging modality that can be used. Recently, image processing approaches have been offered that allow for more generalized application with less of these physical limitations. However, manual user interaction requirements and limited applicability can be issues for these methods.

For example, the method presented in T. Lei, J. K. Udupa, P. K. Saha, and D. Odhner, "Artery-Vein Separation via MRA—An Image Processing Approach," IEEE TMI, Vol. 20., No. 8, August 2001, makes use of fuzzy connectivity to define arteries and veins within Magnetic Resonance Angiography (MRA) image data. Here, the user must specify several points within the image to delineate the arteries and veins. These points are then used to compete against each other within the segmentation. No notion of a tubular bifurcating structure is used in this method. Another approach involving MRA image data that makes use of level set techniques is described in C. M. van Bemmel, L. J. Spreeuwers, M. A. Viergever, and W. J. Niessen, "Level-Set-Based Artery-Vein Separation in Blood Pool Agent CE-M JR Angiograms," IEEE TMI, Vol. 22, No. 10, October 2003. This method makes use of a vessel-like model though level sets and uses a line-filter for segmentation. However, the user must specify paths within both the arterial and venous trees. These requirements of manual interaction limit the possibilities for applications such as CAD or even in cases where further processing is required once manual input is obtained.

An automatic approach for artery-vein segmentation within the lungs of computed tomography (CT) images was presented in T. Bulow, R. Wiemaker, T. Blaffert, C. Lorenz, and S. Renisch, "Automatic Extraction of the Pulmonary Artery Tree from Multi-Slice CT Data," SPIE Medical Imaging 2005: Physiology, Function, and Structure from Medical Images, pp. 730-740, 2005. This method makes use of the airways to help isolate arteries from the veins. Here, a tree model of the segmented vessels is evaluated at each point to determine if nearby airways follow these vessels. Vessels with a higher measure of likely airways are determined to be arteries and all descendants are classified as such. This method, however, is limited to the lungs.

A generalized approach for tree separation in segmented structures was presented in S. R. Aylward and E. Bullitt, "Initialization, Noise, Singularities, and Scale in Height Ridge Transversal for Tubular Object Centerline Extraction," IEEE TMI, Vol. 21, No. 2, February 2002 and U.S. Patent Application Publication No. 2006/0056685, "Method and Apparatus for Embolism Analysis", filed Aug. 12, 2005. In the method disclosed in U.S. Patent Application Publication No. 2006/0056685, a tree model was fitted to a segmentation and intersecting branches from other tree structures were detected and eliminated based upon expected normal branch angles. This method was applied to a sub-tree of an entire tree structure that was manually chosen by a user. Although this method is promising, a fully automatic approach is desired for some applications, since applying this method to an entire tree structure may be time consuming given the complexity of the tree structure.

SUMMARY OF THE INVENTION

In an exemplary embodiment of the present invention a method for labeling connected tubular objects within segmented image data, comprises: receiving segmented image data; and labeling the segmented image data to identify a plurality of components in the segmented image data, wherein the labeling includes: processing the segmented image data to create a processed image that represents centerline and radii estimates of the connected tubular components; determining seed point candidates in the processed image that are within a band of radii; grouping the candidates based on their physical distance from each other and their radii estimates; partitioning the segmented image data in accordance with the grouped candidates; and assigning a separate color label to each of the plurality of components that are different from each other.

Determining seed point candidates and grouping the candidates are repeated by using other bands of radii until a minimum or maximum number of grouped candidates is found.

The segmented image data is partitioned by performing a competitive region growing on the processed image, a fuzzy connectedness segmentation on the processed image, a level-set segmentation on the processed image, a fast-marching segmentation on the processed image or a watershed segmentation on the processed image.

The method further comprises receiving original image data corresponding to the segmented image data, wherein the processing is applied to the original image data in addition to the segmented image data to create the processed image.

After labeling the segmented image data, the method further comprises for each labeled component, determining if the component is to be further separated by: fitting a tree model to the component; dividing the component into at least two components if the tree model indicates that there are at least two trees present for the component; and re-labeling the divided component.

After labeling the segmented image data, the method further comprises for each labeled component, reconnecting the component to another component and assigning a single label to the reconnected components if they have a physical proximity to each other within a first threshold, a contact surface area within a second threshold and a directional heading within a third threshold.

The method further comprises receiving original image data corresponding to the segmented image data, wherein gray-level values of the original image data are used to determine if the contact surface area between the two components is within the second threshold.

The segmented image data is received from a multi-dimensional imaging modality.

The labeled components are connected tubular objects.

In an exemplary embodiment of the present invention, a system for labeling connected tubular objects within segmented image data, comprises: a memory device for storing a program; a processor in communication with the memory device, the processor operative with the program to: receive segmented image data; and label the segmented image data to identify a plurality of components in the segmented image data, wherein the processor is further operative with the program when labeling to: process the segmented image data to create a processed image that represents centerline and radii estimates of the connected tubular components; determine seed point candidates in the processed image that are within a band of radii; group the candidates based on their physical distance from each other and their radii estimates; partition the segmented image data in accordance with the grouped candidates; and assign a separate color label to each of the plurality of components that are different from each other.

The seed point candidates are determined and the candidates are grouped by using other bands of radii until a minimum or maximum number of grouped candidates is found.

The segmented image data is partitioned by performing a competitive region growing on the processed image, a fuzzy connectedness segmentation on the processed image, a level-set segmentation on the processed image, a fast-marching segmentation on the processed image or a watershed segmentation on the processed image.

The processor is further operative with the program after labeling the segmented image data to: for each labeled component, determine if the component is to be further separated, wherein the processor is further operative with the program when determining if the component is to be further separated to: fit a tree model to the component; divide the component into at least two components if the tree model indicates that there are at least two trees present for the component; and relabel the divided component.

The processor is further operative with the program after labeling the segmented image data to: for each labeled component, reconnect the component to another component and assign a single label to the reconnected components if they have a physical proximity to each other within a first threshold, a contact surface area within a second threshold and a directional heading within a third threshold.

The processor is further operative with the program to receive original image data corresponding to the segmented image data, wherein gray-level values of the original image data are used to determine if the contact surface area between the two components is within the second threshold.

The segmented image data is received from a multi-dimensional imaging device.

The processor is further operative with the program to display the labeled segmented image data.

The labeled components are connected tubular objects.

In an exemplary embodiment of the present invention, a method for separating components within segmented medical image data, comprises: receiving the segmented medical image data, wherein the components are arteries, veins and extraneous structures; separately labeling the components in the segmented medical image data, wherein the labeling includes: applying a distance transform to the segmented medical image data by labeling each segmented point in the segmented medical image data based on its distance to a surface of the segmentation to create distance labeled image data; determining seed point candidates in the distance labeled image data that are within a band of radii; grouping the candidates to each other if their physical distance to each other is less than a minimum or maximum of their radii estimates; performing a competitive region growing on each of the groups of candidates in the distance labeled image data to partition the segmented medical image data into the components; and assigning a different color label to each of the components; for each of the components, determining if they are to be further separated by: fitting a tree model to the component; dividing the component into at least two components if the tree model indicates that there are at least two trees present for the component; and re-labeling the divided component; and for each of the labeled components, reconnecting the component to another component and assigning a single label to the reconnected components if they have a physical proximity to each other within a first threshold, a contact surface area within a second threshold and a directional heading within a third threshold.

Determining seed point candidates and grouping the candidates are repeated by using other bands of radii until a minimum or maximum number of grouped candidates is found.

The segmented medical image data is received from a multi-dimensional medical imaging modality.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Presented herein is a method for separating originally distinct tubular objects with possible noise that does not depend on the use of the airways. The method takes as an input an original image along with an initial segmentation thereof and then outputs a separation of the segmentation into components such as the arteries, veins, and extraneous structures. The method makes use of an expected model for further refinements. Unlike previous methods, which operate during the segmentation, this method operates on the given segmented data itself. Hence, it is applicable to any segmented image of a branching tubular structure regardless of imaging modality and segmentation method.

Figure 1:
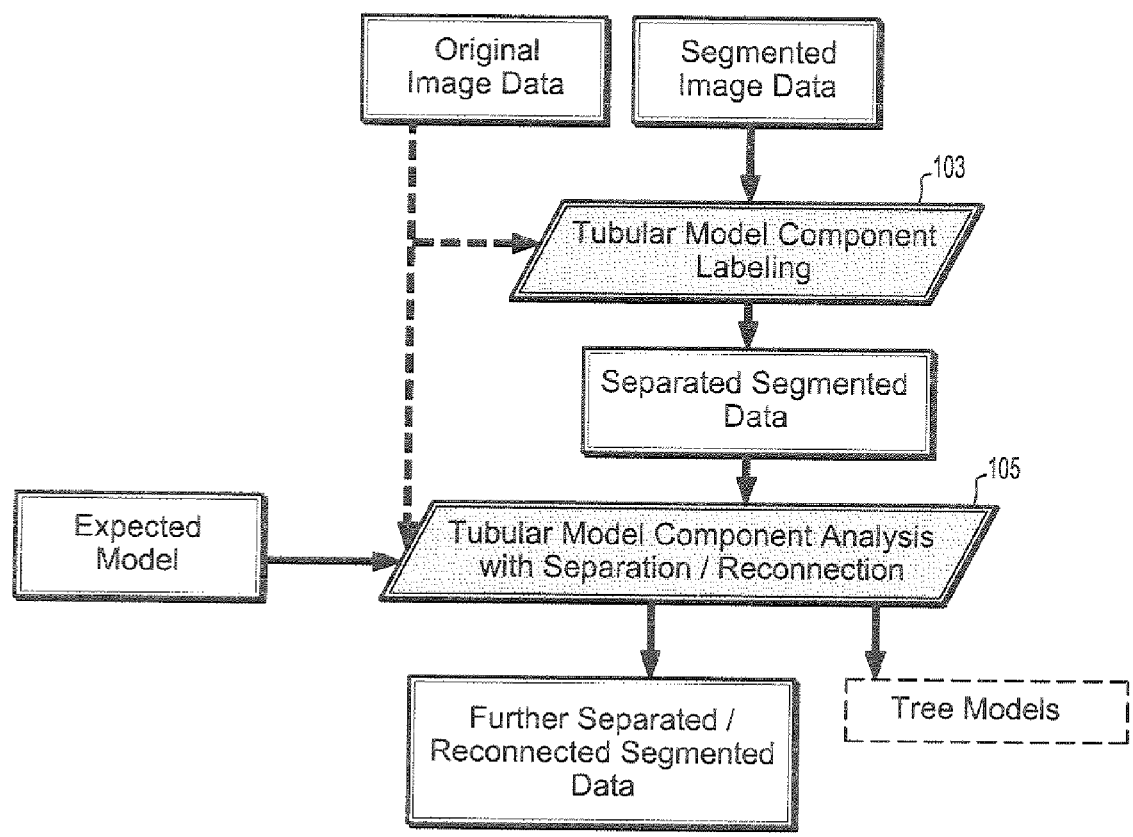
FIG. 1 is a high-level flow diagram illustrating a method for automatic separation of segmented tubular and circular objects according to an exemplary embodiment of the present invention.

The method consists of two phases as shown in FIG. 1. The first phase (103) performs a tubular model component labeling of a segmented image. This step separates the segmented image into separate components based on a tubular model. Depending, upon proper scale parameters, this step can clearly differentiate larger structures. With a smaller scale, it tends to create many isolated tree-like components.

The second phase (105) operates on the components created by the first phase (103). Here, the shape and connectivity of each component is analyzed. Using an expected model of the branching structure, each component is either reconnected with other components or further separated for reconsideration. The specific models of expected anatomy can be used for automatic identification of the arterial and venous trees and can provide improved performance.

The two phases (103) and (105) outlined in FIG. 1 for separation of a segmented image into tubular components will now be described under the headings Tubular Model Component Labeling and Component Analysis with Separation/Reconnection, respectively. In the following description, the input is segmented image data and optionally, depending upon the implementation, original image data. All implementation dependent data is represented as proceeding with dotted lines in FIG. 1. After a general description of each phase, each section is followed by an implementation example. Existing and further applications of the present invention will be described under the heading Applications.

Tubular Model Component Labeling

Figure 2:
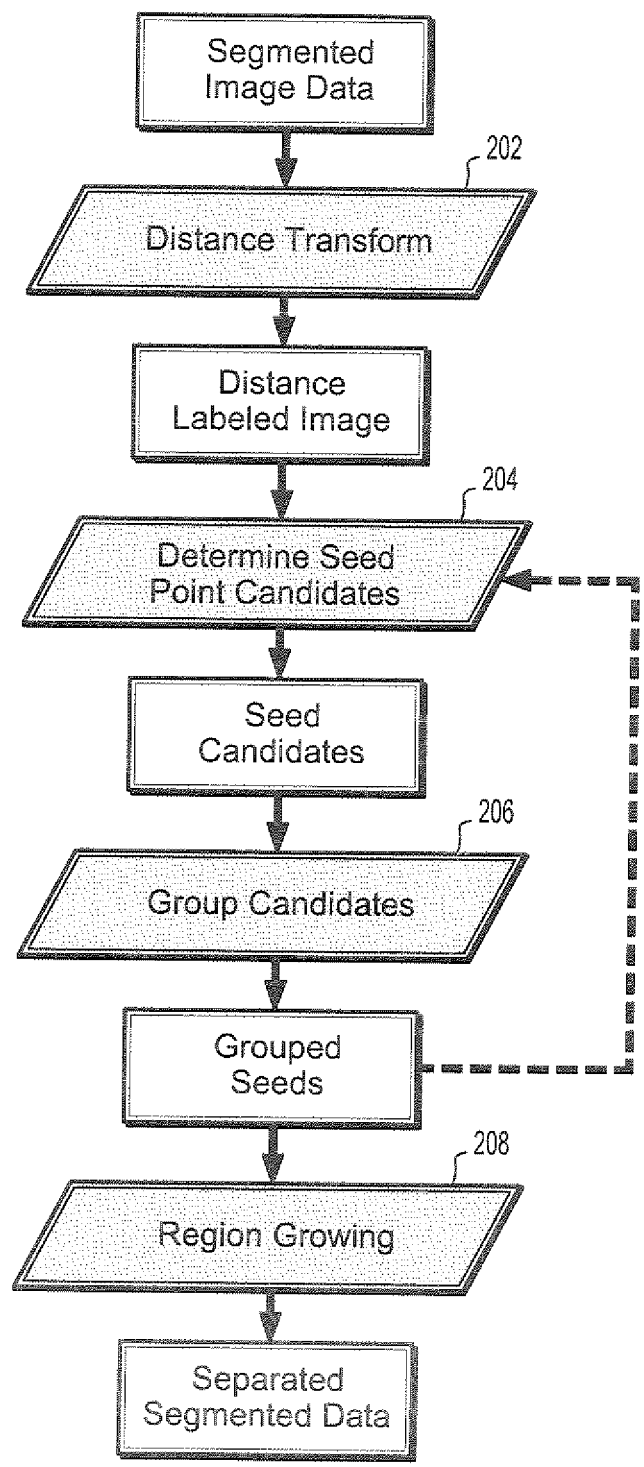
FIG. 2 is a detailed flow diagram illustrating the step of tubular model component labeling shown in FIG. 1.

As shown in FIG. 2, the first phase (103) proceeds by first converting (202) segmented image data into a structure that reflects the likelihood of centerlines, C, along with a radius estimate at each point, r. This conversion may make use of only the segmented image data but can also depend on the original image data as well. A hand of radii of interest $[r_1, r_2]$ is first specified (204). This scale range helps determine points that are candidates for core components. Hence, each point within the image such that its radius estimate is $r_1 \leq r \leq r_2$ becomes a candidate. Next, the candidates are grouped together into a set of n groups based on their physical proximity and their radii estimates (206). Depending upon the physical location and the radius estimates, two given seeds are assigned to the same group. If additional seeds are also in close proximity, they will be added to this group as well. If no seeds are grouped together, the total number of groups will be the total number of initial seeds. In the case of all seeds being grouped together, only a single group will result. In practice, the actual number of groups falls between these two extremes. At this early stage, since the total number of groups n is already known, changes to the scale and parameters can be made until the minimum expected number of groups are found (this is represented by the dashed line in FIG. 2). Once the groups and corresponding candidates are determined, they are used to partition the segmented image into different components by competing against each other within the likelihood measure C (208). Depending upon the scale factors chosen, these could be many components or just several.

Figure 3:
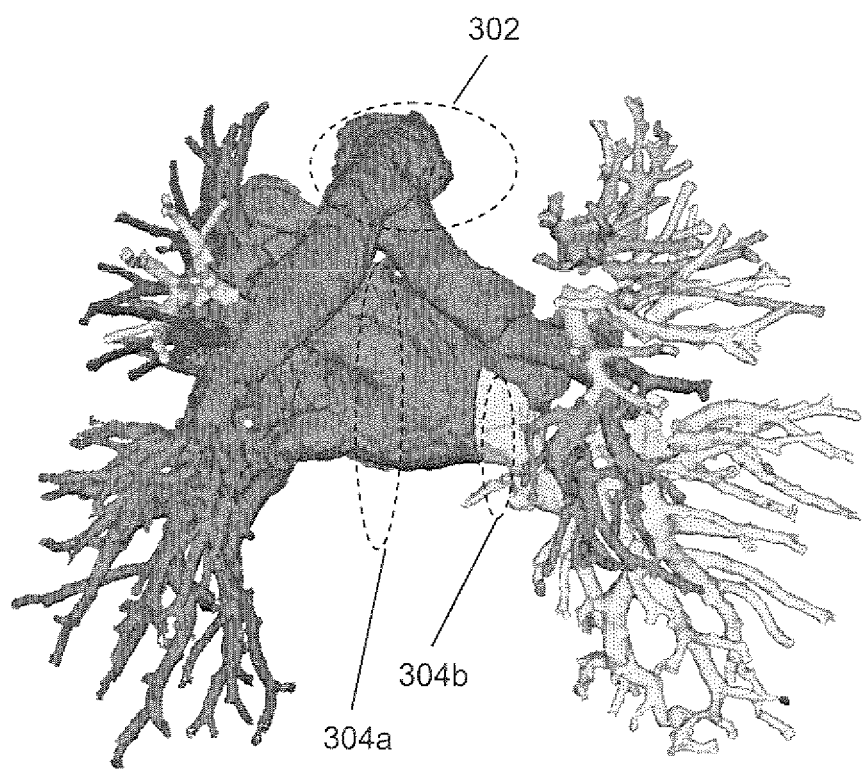
FIG. 3 is an image illustrating a large-scale tubular model component labeling applied to vessels in and around the heart according to an exemplary embodiment of the present invention.
Figure 4:
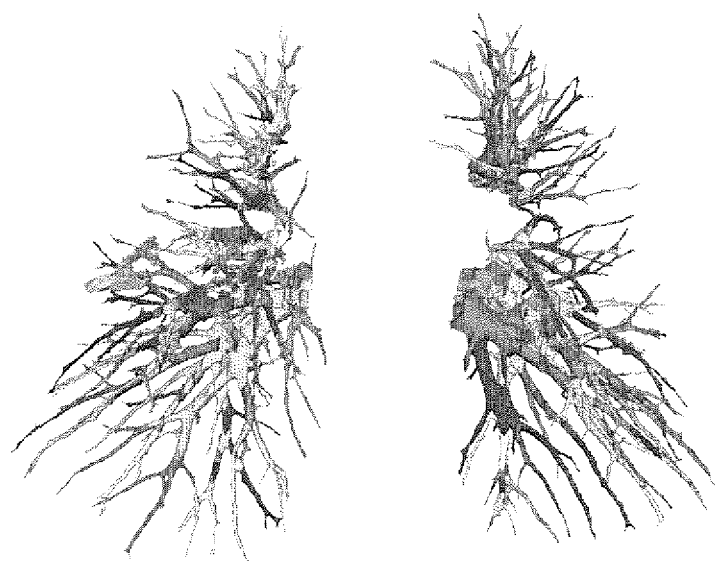
FIG. 4 is an image illustrating a small-scale tubular model component labeling applied to vessels in the lungs according to an exemplary embodiment of the present invention.

Visual examples of this phase are shown in FIGS. 3 and 4. In both cases a single component of the vessels connected to the main pulmonary artery and vein are given as input. In FIG. 3 a band of [9 mm, +∞] was used. This isolated major components such as the pulmonary artery 302, the pulmonary vein 304a/304b, and the aorta. The aorta was removed automatically based upon size and location. Note that although larger components are separated, smaller components are fused together. In some cases, the smaller arteries and veins produce good separation at the smaller level, but this is not always the case. When taking the band to [3 mm, 7 mm] as shown in FIG. 4, the smaller components show good separation into individual tree structures (as indicated by the differences in shading). These components can then be reconnected into complete tree structures as will be described for the second phase under the heading Component Analysis with Separation/Reconnection.

The general description of this phase can be implemented in several different ways. In the examples shown in FIGS. 3 and 4, a Euclidean distance transform was applied to the segmented image data. This transform labeled each point based upon its distance to the surface and served as both the radius estimate and the centerline likelihood. Points were collected based upon their radius measurements. Candidates were grouped if their physical distance was less than the minimum of either of their radius estimates. Once grouped, a competitive region growing was performed. This process took each group and allowed them to grow into neighboring points based upon a set of rules taken from the distance transformed image and the individual group and point characteristics. In the implementations for FIGS. 3 and 4, the distance measure gave priority to those points growing from larger radii. There was also priority for growing into the same value regions and penalty for growing into regions of high differences. These rules were coded into the competitive region growing algorithm.

As mentioned before this is just one possibility for this method. Obtaining a radius estimate to collect candidates can also involve the original image data by taking a distance transform of strong edges. Using a scale for a line filter can also provide this estimate. Once the grouped candidates are obtained multiple possibilities exist for the competition of the seeds. Besides competitive region growing, fuzzy seeded region growing, level-set methods, fast marching methods, and watershed transforms can be used. Basically, any method that accepts seeds to define regions can be used. The rules by which the seeds grow need to be governed by the tubular structure of the object to allow is/or better partitioning into components. Depending upon the method, this can be encoded into a transform of the image. The same distance transform can work as a speed image for a level-set or fast marching method. The level-set method can additionally prefer a tubular shape to allow for better isolation into separate components.

Component Analysis with Separation/Reconnection

As shown in FIG. 1, the second phase (105) is applied to the output of the first phase (I 03). Multiple components are given as input. Each component is classified into two possible groups. The first group is a normal isolated tree component. The second group is a tree component with additional components such as extraneous segmentation noise or other tree structures. The expected model helps classify each component into these two categories.

Next, components in the second grouping are further separated to ensure all components are only isolated portions of the tree. This separation is done based on the expected model of the tree branching structure. All components are then reconnected based upon what is expected with the given model. Physical connections and predicted headings of the tree structure are used to determine if two components should be connected or considered separate. The end result is separate tree segmentations along with clean up of false positive artifacts not consistent with the expected model.

Figure 5:
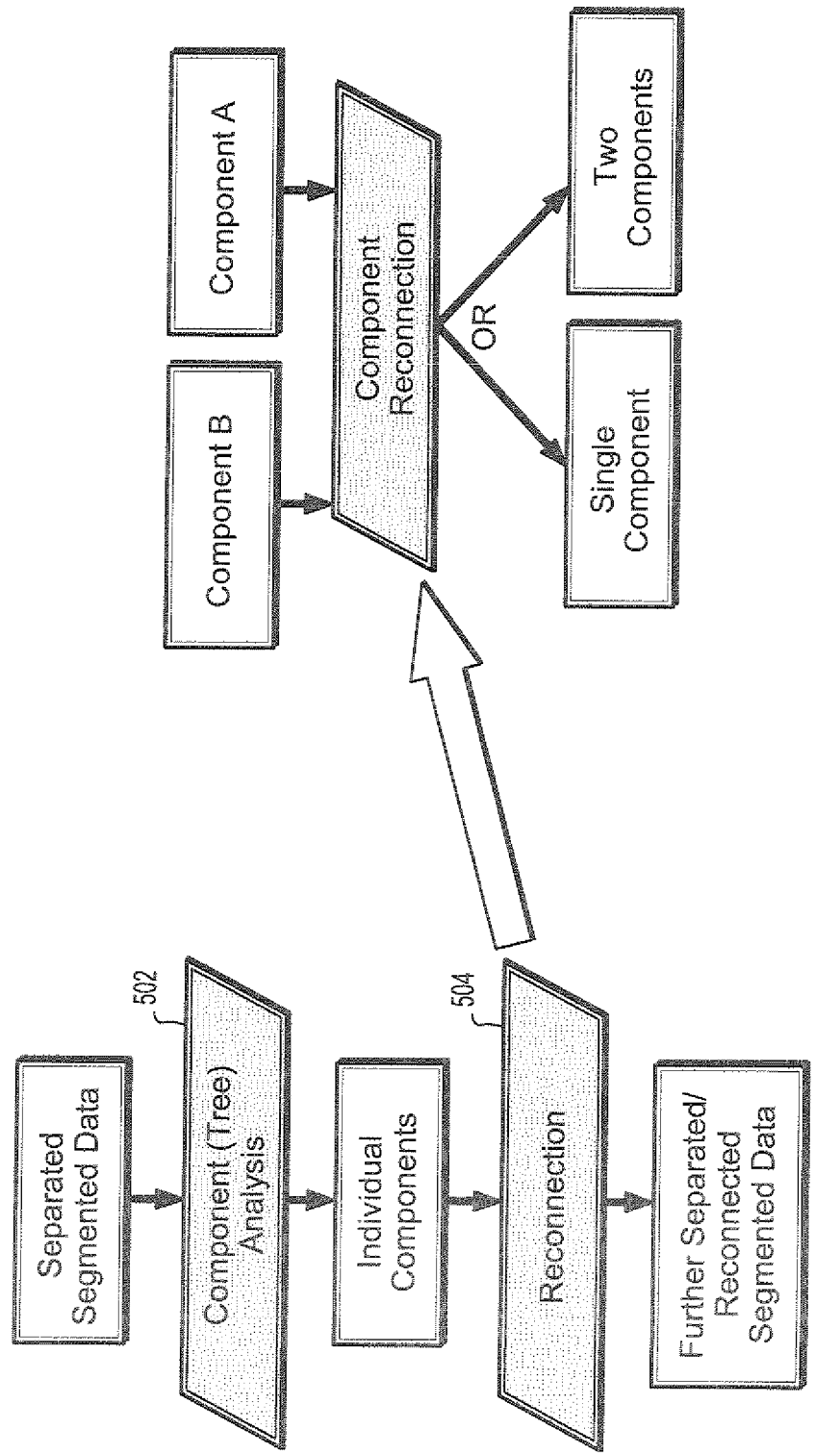
FIG. 5 is a detailed flow diagram illustrating the step of tubular model component analysis with separation/reconnection shown in FIG. 1.

As with the first phase, multiple implementations are possible. The goal here is to not only classify and process the components but also to be able to decide how to reconnect them. In a planned implementation, as shown in FIG. 5, a tree structure is computed for each component via a skeletonization based method as described, for example, in A. P. Kiraly, J. P. Helferty, E. A. Hoffman, G. McLennan, and W. E. Higgins "3D Path Planning for Virtual Bironchoscopy", IEEE TMI, pp. 1365-1379, Vol. 23, November 2004, the disclosure of which is incorporated by reference herein in its entirety. This method describes the component as a series of connected branches and allows an estimate of the branch lengths and angles.

Figure 6:
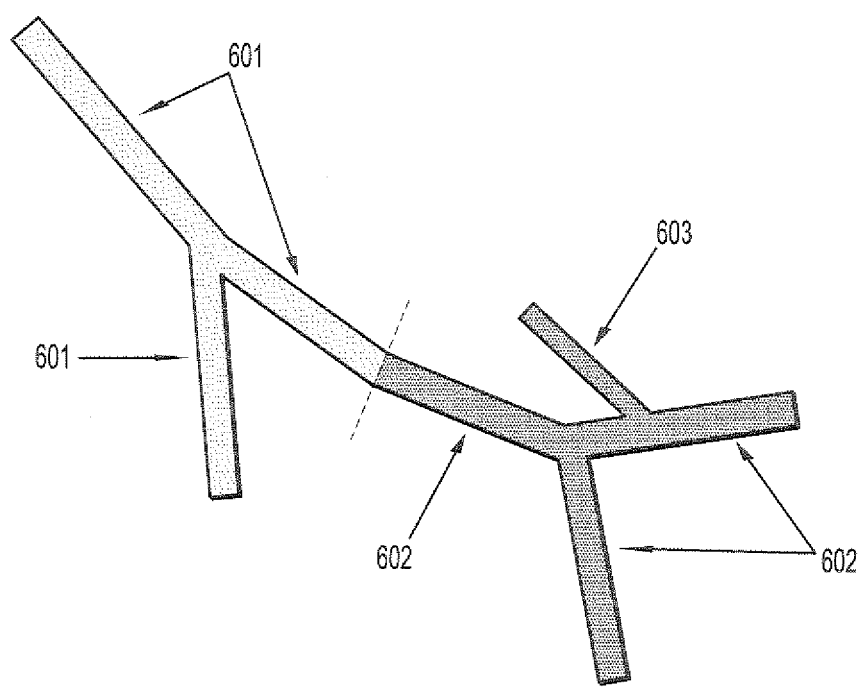
FIG. 6 is a diagram illustrating two components that were isolated during tubular model component labeling according to an exemplary embodiment of the present invention.

Given the tree structure, a method similar to that presented in U.S. Patent Application Publication No. 2006/0056685 and A. P. Kiraly, E. Pichon, D. P. Naidich, C. L. Novak, "Analysis of arterial sub-trees affected by Pulmonary Emboli," SPIE Medical Imaging 2004, 5370, 2004, the disclosures of which are incorporated by reference herein in their entirety, can be used for analysis here (502). For example, in U.S. Patent Application Publication No. 2006/0056685 and A. P. Kiraly, E. Pichon, D. P. Naidich, C. L. Novak, "Analysis of arterial sub-trees affected by Pulmonary Emboli," SPIE Medical imaging 2004, 5370, 2004, complementary angles in branches are analyzed to detect abnormalities. Additionally, branch angles that are less than 90 degrees can be eliminated or separated. In this case, the problem is greatly simplified since a component is simpler than a sub-tree. FIG. 6 illustrates a component 602 with an extraneous branch 603 that can be eliminated based upon angles. The requirement of angles greater than a specified amount is one way to introduce an expected model into this phase. Additionally, since the components are only small sections of the entire tree, branch lengths can be used to identify outliers.

Once each component is properly isolated, the physical connectivity between the components coupled with the branch headings can determine if the two components should be connected (504). For example, in FIG. 6, the component 602 and another component 601 (which were isolated in the labeling step 103) can be reconnected since the headings of their branches are in agreement. Their radius estimates can also play a role in this decision. If the estimated radii are similar and beyond a certain threshold, the connection can definitively be made. Given additional information such as a known artery and vein can help further discriminate the two tree structures.

Applications

Many applications exist for the above-described method. Due to its generality, it can be applied to any vasculature in the body such as that in the liver, legs, lungs, and the brain. It can be used for vessel separation or for cleaning up false positives within the segmentation. Hence, it can be coupled with any segmentation method available and can be applied with any imaging modality.

As described above, the separation of different components in the segmentation of the vessels around the heart helps provide isolation of the pulmonary arteries, veins, and the aortic arch. As discussed earlier, the method was used in an application for visualizing pulmonary embolism (PE) in pulmonary vessels, both for separating the main arteries and veins as well as for eliminating the aortic arch. The end result for a single case is shown in FIG. 3. Here, a minimum diameter of 9 mm was specified for the seed points; thus, the main pulmonary artery and pulmonary veins were clearly separated. Further, processing may be applied to the peripheral vessels but the component labeling demonstrates good results for the major vessels. These are just the results of the first phase 103.

Using a narrow radius band of 3 mm to 7 mm as shown in FIG. 4 created many components. Some individual components were properly separated, i.e., they only contained an artery or vein. However, a small number of components may have contained slight errors. In any event, the problem of separation is greatly simplified by the smaller components as fewer possible errors exist. The knowledge of arteries and veins from the previous run with a larger band can also be used during or at the end of the second phase 105 along with this narrow band data. This information can then be used in the second phase 105 to determine which components need to be reconnected and which components need further separation before reconnection.

The method can also be applied to computed tomographic angiography (CTA) or magnetic resonance angiography (MRA) data of the legs for separation of the arteries and veins. This application can reduce difficulty in the precise timing of the scan currently necessary for proper diffusion of contrast material.

In addition, even if the segmented tree structure is that of a single tree, errors can still exist. In this case, the method can be used to remove extraneous artifacts from the tree structure. Hence, the method can be applicable to segmentations of the airway tree to clean up false positives.

Presented above is method for dividing a single segmented object of tree structures while at the same time clearing errors in segmentation. It proceeds in a two phase approach where individual components are separated based on automatically placed groups of seeds competing to create individual components. These components are then analyzed and regrouped in the second phase according to a model. Additional information involving arterial or venous locations can be applied for automatic identification of the separated trees.

A system in which the above-described exemplary embodiments of the present invention may be implemented will now be described.

Figure 7:
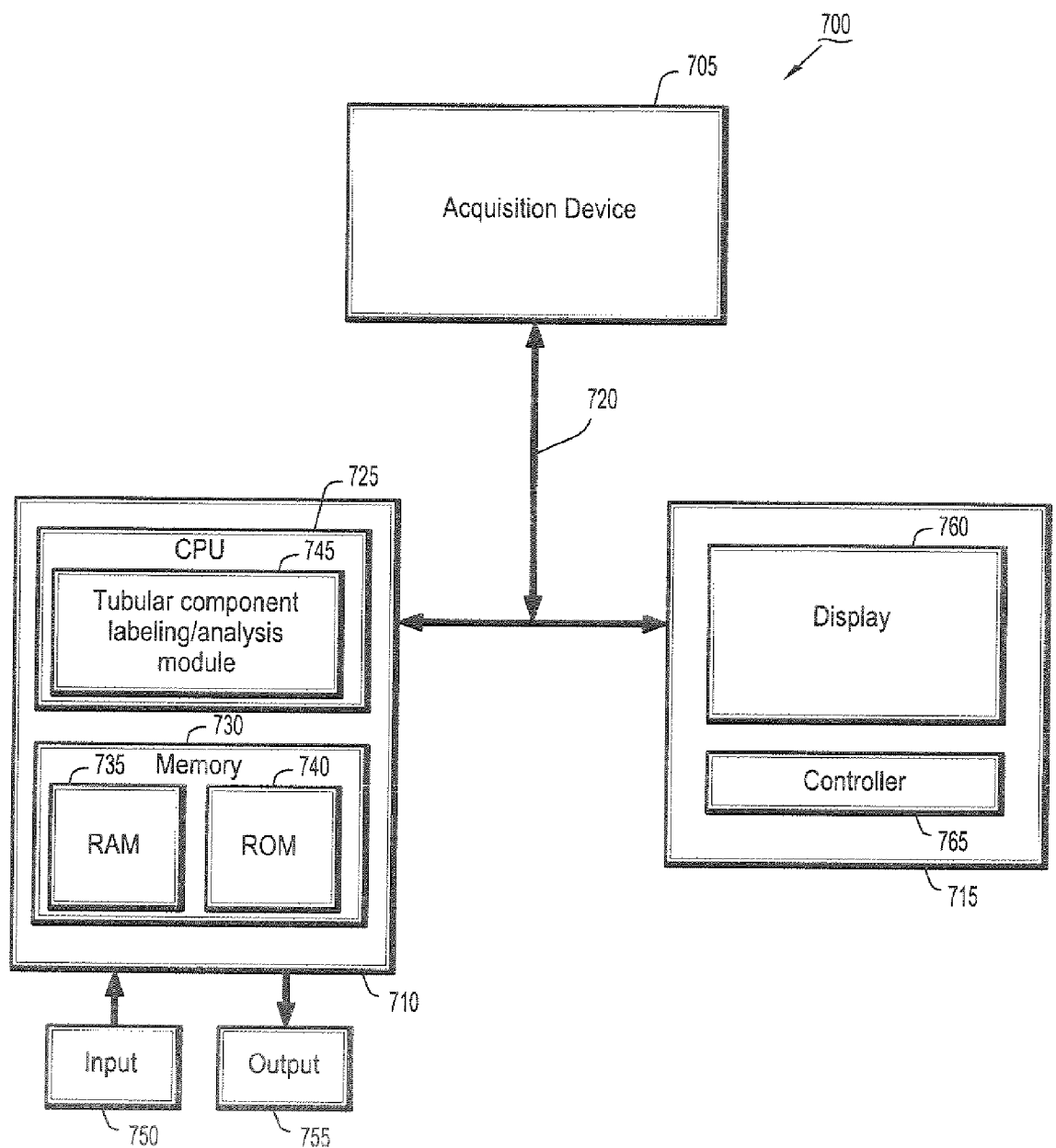
FIG. 7 is a block diagram illustrating a system for automatic separation of segmented tubular and circular objects according to an exemplary embodiment of the present invention.

As shown in FIG. 7, a system 700 includes an acquisition device 705, a personal computer (PC) 710 and an operator's console 715 connected over a wired or wireless network 720. The acquisition device 705 may be a CT imaging device or any other three dimensional (3D) high-resolution imaging device such as a magnetic resonance (MR) scanner or ultrasound scanner.

The PC 710, which may be a portable or laptop computer, a medical diagnostic imaging system or a picture archiving communications system (PACS) data management station, includes a central processing unit (CPU) 725 and a memory 730 connected to an input device 750 and an output device 755. The CPU 725 includes a tubular component labeling/analysis module 745 that includes software for executing methods in accordance with exemplary embodiments of the present invention. Although shown inside the CPU 725, the tubular component labeling/analysis module 745 can be located outside the CPU 725.

The memory 730 includes a random access memory (RAM) 735 and a read-only memory (ROM) 740. The memory 730 can also include a database, disk drive, tape drive, etc., or a combination thereof. The RAM 735 functions as a data memory that stores data used during execution of a program in the CPU 725 and is used as a work area. The ROM 740 functions as a program memory for storing a program executed in the CPU 725. The input 750 is constituted by a keyboard, mouse, etc., and the output 755 is constituted by a liquid crystal display (LCD), cathode ray tube (CRT) display, printer, etc.

The operation of the system 700 can be controlled from the operator's console 715 which includes a controller 765, e.g., a keyboard, and a display 760. The operator's console 715 communicates with the PC 710 and the acquisition device 705 so that image data collected by the acquisition device 705 can be rendered by the PC 710 and viewed on the display 760. The PC 710 can be configured to operate and display information provided by the acquisition device 705 absent the operator's console 715, by using, e.g., the input 750 and output 755 devices to execute certain tasks performed by the controller 765 and display 760.

The operator's console 715 may further include any suitable image rendering system tool/application that can process digital image data of an acquired image dataset (or portion thereof to generate and display images on the display 760. More specifically, the image rendering system may be an application that provides rendering and visualization of medical image data, and which executes on a general purpose or specific computer workstation. The PC 710 can also include the above-mentioned image rendering system/tool/application.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created but the invention is to be defined in accordance with the claims that follow. It can be appreciated that many of those undescribed embodiments are within the literal scope of the following claims, and that others are equivalent.

What is claimed is:

1. A method for labeling connected tubular objects within segmented image data, comprising:

receiving segmented image data, wherein the segmented image data includes pixels of original image data that are assigned labels such that pixels with the same label share certain visual characteristics; and labeling the segmented image data to identify a plurality of components within the segmented image data, wherein the labeling includes:

processing the segmented image data to create a processed image that represents centerline and radii estimates of the connected tubular components to divide the components based on tubular diameter;

determining seed point candidates in the processed image that are within a band of radii;

grouping the candidates based on their physical distance from each other and their radii estimates;

partitioning the segmented image data in accordance with the grouped candidates; and assigning a separate color label to each of the plurality of components that are different from each other, wherein the components include arteries and veins that are differentiated based on the labeling and the labeling is automatic and performed using a processor, and after labeling the segmented image data, the method further comprises:

for each labeled component, reconnecting the component to another component and assigning a single label to the reconnected components based on an expected model of a branching structure, wherein the expected model classifies each component into one of a first group and a second group, the first group includes normal isolated tree components and the second group includes extraneous noise and other tree structures, and then, the expected model separates the components in the second group to ensure all components are only isolated portions of the tree.

2. The method of claim 1, wherein determining seed point candidates and grouping the candidates are repeated by using other bands of radii until a minimum or maximum number of grouped candidates is found.

3. The method of claim 1, wherein the segmented image data is partitioned by performing a competitive region growing on the processed image, a fuzzy connectedness segmentation on the processed image, a level-set segmentation on the processed image, a fast-marching segmentation on the processed image or a watershed segmentation on the processed image.

4. The method of claim 1, wherein the processed image includes the original image data.

5. The method of claim 1, wherein for each labeled component, the reconnecting of the component to another component and assigning of a single label to the reconnected components is further based on a physical proximity of the components to each other, a physical connection between the components and a directional heading of the components.

6. The method of claim 5, further comprising receiving the original image data corresponding to the segmented image data, wherein gray-level values of the original image data are used to determine the physical connection between the two components.

7. The method of claim 1, wherein the segmented image data is received from a multidimensional imaging modality.

8. The method of claim 1, wherein the band of radii used to determine seed point candidates in the processed image is from 3 mm to 7 mm.

9. A system for labeling connected tubular objects within segmented image data, comprising:
- a memory device for storing a program;
- a processor in communication with the memory device, the processor operative with the program to:
  - receive segmented image data, wherein the segmented image data includes pixels of original image data that are assigned labels such that pixels with the same label share certain visual characteristics; and
  - label the segmented image data to identify a plurality of components within the segmented image data, wherein the processor is further operative with the program when labeling to:
  - process the segmented image data to create a processed image that represents centerline and radii estimates of the connected tubular components to divide the components based on tubular diameter;
  - determine seed point candidates in the processed image that are within a band of radii;
  - group the candidates based on their physical distance from each other and their radii estimates;
  - partition the segmented image data in accordance with the grouped candidates; and
  - assign a separate color label to each of the plurality of components that are different from each other,
  - wherein the components include arteries and veins that are differentiated based on the labeling and the labeling is automatic, and
  - the processor is further operative with the program after labeling the segmented image data to:
  - for each labeled component, reconnect the component to another component and assign a single label to the reconnected components based on an expected model of a branching structure, wherein the expected model classifies each component into one of a first group and a second group, the first group includes normal isolated tree components and the second group includes extraneous noise and other tree structures, and then, the expected model separates the components in the second group to ensure all components are only isolated portions of the tree.

10. The system of claim 9, wherein the seed point candidates are determined and the candidates are grouped by using other bands of radii until a minimum or maximum number of grouped candidates is found.

11. The system of claim 9, wherein the segmented image data is partitioned by performing a competitive region growing on the processed image, a fuzzy connectedness segmentation on the processed image, a level-set segmentation on the processed image, a fast-marching segmentation on the processed image or a watershed segmentation on the processed image.

12. The system of claim 9, wherein for each labeled component, the reconnection of the component to another component and assignment of a single label to the reconnected components is further based on a physical proximity of the components to each other, a physical connection between the components and a directional heading of the components.

13. The system of claim 12, wherein the processor is further operative with the program to receive the original image data corresponding to the segmented image data, wherein gray-level values of the original image data are used to determine the physical connection between the two components.

14. The system of claim 9, wherein the segmented image data is received from a multi-dimensional imaging device.

15. The system of claim 9, wherein the processor is further operative with the program to:
- display the labeled segmented image data.

16. A method for separating components within segmented medical image data, comprising:
- receiving the segmented medical image data, wherein the segmented image data includes pixels of original image data that are assigned labels such that pixels with the same label share certain visual characteristics, and wherein the components are arteries, veins and extraneous structures;
- separately labeling the components in the segmented medical image data, wherein the labeling includes:
  - applying a distance transform to the segmented medical image data by labeling each segmented point in the segmented medical image data based on its distance to a surface of the segmentation to create distance labeled image data;
  - determining seed point candidates in the distance labeled image data that are within a band of radii;
  - grouping the candidates to each other if their physical distance to each other is less than a minimum of their radii estimates;
  - performing a competitive region growing on each of the groups of candidates in the distance labeled image data to partition the segmented medical image data into the components; and
  - assigning a different color label to each of the components; and
  - for each of the labeled components, reconnecting the component to another component and assigning a single label to the reconnected components based on an expected model of the tree structure, wherein the expected model classifies each component into one of a first group and a second group, the first group includes normal isolated tree components and the second group includes extraneous noise and other tree structures, and then, the expected model separates the components in the second group to ensure all components are only isolated portions of the tree,
  - wherein the components include arteries and veins that are differentiated based on the labeling and the labeling is automatic and performed using a processor.

17. The method of claim 16, wherein determining seed point candidates and grouping the candidates are repeated by using other bands of radii until a minimum or maximum number of grouped candidates is found.

18. The method of claim 16, wherein the segmented medical image data is received from a multi-dimensional medical imaging modality.

* * * * *